United States Patent [19]

Heiskell et al.

[11] Patent Number: 4,475,714
[45] Date of Patent: Oct. 9, 1984

[54] PIANO LIFT

[76] Inventors: Ronald E. Heiskell, 2632 Mallard Ct., Union City, Calif. 94587; Gregg R. Kirkpatrick, 943 Seascape Cir., Rodeo, Calif. 94572; Garry F. Newman, 2710 Colony Dr., Tracy, Calif. 95376; James D. Stewart, 259 MacArthur, Apt. 117, Oakland, Calif. 94610

[21] Appl. No.: 401,861

[22] Filed: Jul. 26, 1982

[51] Int. Cl.³ .............................................. B66F 7/12
[52] U.S. Cl. ................................................ 254/89 H
[58] Field of Search ............... 254/89 H, 45, 47, 2 R, 254/2 B, 2 C, 8 R, 8 B, 8 C; 91/35; 84/174, 177; 414/589, 495

[56] References Cited

U.S. PATENT DOCUMENTS

| | | | |
|---|---|---|---|
| 2,904,308 | 9/1959 | Vergara | 254/8 R |
| 3,112,836 | 12/1963 | Back | 254/45 |
| 3,750,516 | 8/1973 | Olson | 84/174 |
| 4,112,823 | 9/1978 | Liberman et al. | 91/35 |
| 4,168,099 | 9/1979 | Jacobs et al. | 269/325 |

FOREIGN PATENT DOCUMENTS 1128962 5/1962 Fed. Rep. of Germany ... 254/89 H

Primary Examiner—Robert C. Watson
Attorney, Agent, or Firm—Keith T. Bleuer

[57] ABSTRACT

A grand piano lift comprising a dolly on which the piano is placed and having a hydraulic cylinder fixed in vertical disposition to the dolly in the vicinity of each of the three legs of the piano. A piston is slidably disposed in each of the cylinders and has a piston rod extending from the piston fixed to a pedestal that contacts the floor or platform from which the piano is to be supported. An operator operated UP switch is electrically connected with a source of hydraulic fluid under pressure so that the operator can cause fluid to be applied to the cylinders from the source and so that the cylinders are effective to raise the dolly and piano. A similar DOWN switch causes this fluid to be drained from the cylinders to cause the piano to be lowered. A ball check valve prevents the undesired descent of the piano when neither switch is actuated, and a flow divider causes equal volumes of fluid to be applied to the three cylinders for the equal upward travel of the three legs of the piano when the piano is being raised.

7 Claims, 8 Drawing Figures

PIANO LIFT

BACKGROUND OF THE INVENTION

The invention relates to musical instruments and particularly to pianos and still more particularly to piano lifts.

As is well known, a piano ordinarily sets on a stage platform or floor and has its keyboard at a particular fixed height above the floor. Some performers wish to play the piano and sing at the same time; and this fixed height of keyboard does not enable the performer to do both comfortably at the same time, since the performer can better sing while standing. Also, this fixed height of keyboard is not comfortable with pianists of all heights; and a tall pianist would better be accommodated with a higher keyboard while a very short pianist would better be accommodated with a lower keyboard.

SUMMARY OF THE INVENTION

It is an object of the invention to provide an improved means for lifting a piano, particularly a grand piano having three supporting legs, so as to raise the keyboard of the piano to a comfortable height for a person who desires to stand while singing and play the piano at the same time.

In a preferred form, the piano lift of the invention uses a conventional dolly on which such a grand piano may be set, with hydraulic cylinders according to the invention being fixed in vertical disposition on the three legs of the dolly and adjacent to the three piano legs and having pistons in them that are connected by means of piston rods with pedestals that set on the stage or floor. Hydraulic pressure is supplied to the cylinders under the control of a pair of foot switches, one being for UP operation and the other being for DOWN operation. The two switches control a directional control valve by means of electromagnets so that hydraulic pressure is supplied to the cylinders for raising the dolly and piano when the UP switch is closed and so that the hydraulic pressure is bled from the cylinders and is applied to opposite sides of the pistons in the cylinders for downward movement of the dolly and piano. A flow divider is in the hydraulic circuit for the cylinders so that equal volumes of fluid under pressure are provided to the cylinders in the raising action by the lift and so that the piano remains horizontal at all times. A ball check valve is also provided in the hydraulic circuitry so that, after the piano has been raised, the hydraulic fluid does not drain from the cylinders allowing the undesired falling of the dolly and piano.

DESCRIPTION OF THE PREFERRED EMBODIMENTS

Figure 1:
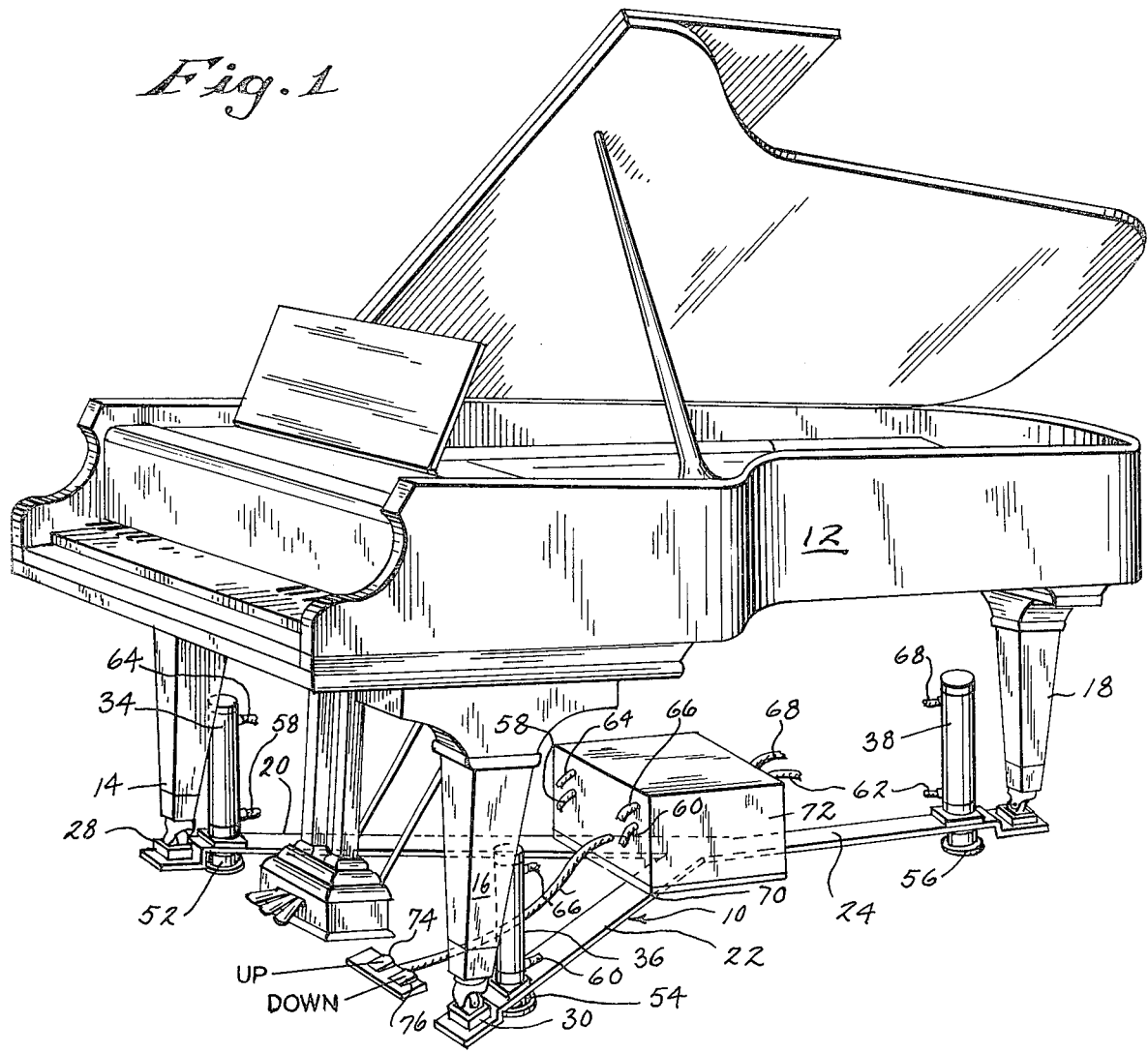
FIG. 1 is an isometric view of a supporting dolly fitted with hydraulic cylinders and showing a three-legged grand piano supported by the dolly.
Figure 2:
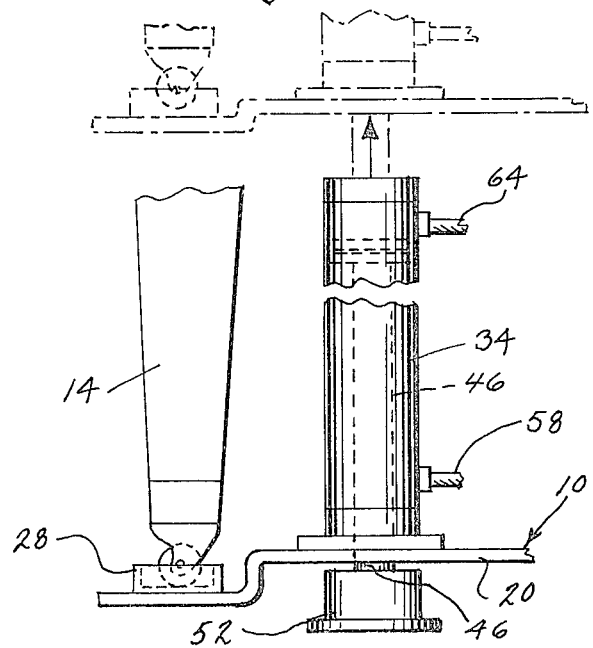
FIG. 2 is a side elevational view on an enlarged scale of one of the hydraulic cylinders and the associated piano leg and showing the leg and cylinder in changed positions in dotted lines.

Referring now to the drawings and in particular to FIG. 1, the piano lift of the invention may be seen to comprise a piano dolly 10 particularly adapted to support and shown in FIG. 1 as supporting a grand piano 12 having the three legs 14, 16 and 18. The dolly 10, for this purpose, has three legs 20, 22 and 24 of flat strip material extending generally radially and fixed with respect to each other at approximately the center. The legs 20, 22 and 24 respectively are provided with cups 28, 30 and 32 on the ends of the legs for receiving the lower ends of the piano legs 14, 16 and 18 so that the dolly supports the piano 10. It will be noted from FIGS. 1 and 2 that the legs 20, 22 and 24 lengthwise are flat except for the portions of the legs 20, 22 and 24 carrying the cups 28, 30 and 32 which are at a lower level than the remainder of the legs 20, 22 and 24 due to a downwardly extending connecting portion of each leg.

Cylinders 34, 36 and 38 are fixed respectively on the dolly legs 20, 22, and 24, and in particular the cylinders 34, 36 and 38 have their lower ends fixed on these dolly legs so as to be in vertical disposition, assuming that the legs 20, 22 and 24 are horizontal as is generally the case. It will be noted that the cylinders 34, 36 and 38 are mounted on the legs 20, 22 and 24 to be adjacent to the cups 28, 30 and 32 so that the cylinders extend along side of and are close to the piano legs 14, 16 and 18. Since the cylinders 34, 36 and 38 are mounted on the legs 20, 22 and 24 having the cups 28, 30 and 32 on their ends, the cylinders 34, 36 and 38 are thus in an imaginary triangle having its corners on the cups 28, 30 and 32. Pistons 40, 42 and 44 (see FIG. 3) are slidably disposed respectively in the cylinders 34, 36 and 38; and these pistons are connected with the piston rods 46, 48 and 50 that extend downwardly through and out of the lower ends of the respective cylinders. The piston rods 46, 48 and 50 are respectively fixed in holders or pedestals 52, 54 and 56 (see FIGS. 1 and 2) that are adapted to rest on the platform or floor which will support the piano and away from which the piano lift of the invention raises the piano. Hydraulic inlet conduits 58, 60 and 62 are respectively connected to the lower ends of the cylinders 34, 36 and 38, and hydraulic inlet conduits 64, 66, and 68 are connected to the respective upper ends of the cylinders 34, 36 and 38. The hydraulic conduits are connected with hydraulic controls 70, which may be supported on the dolly 10 at about its center, and the controls 70 are connected with electrical controls 72 which may also be supported in the same manner. The piano lift is under control of UP and DOWN foot pedal switches 74 and 76, and the switches 74 and 76 are connected with the electrical controls 72.

Figure 3:
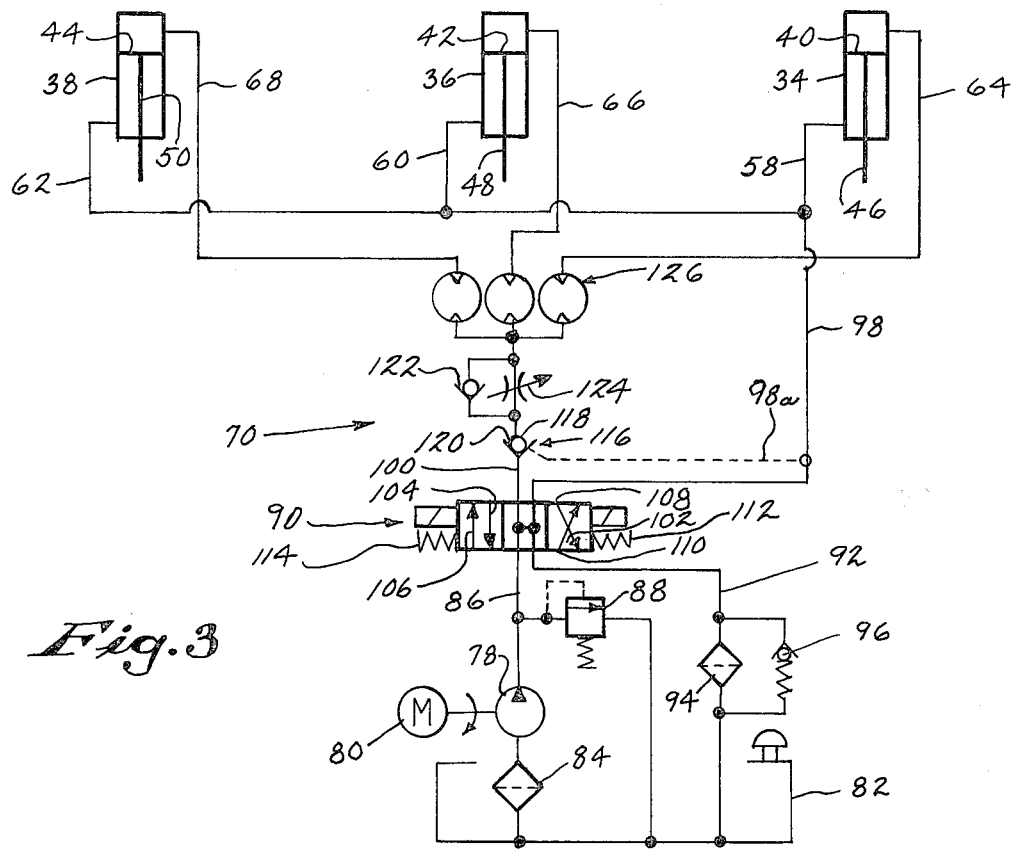
FIG. 3 is a schematic illustration of a hydraulic system connected with the cylinders for causing the dolly and the piano to raise and lower.

The hydraulic controls 70 are shown specifically in FIG. 3 and may be seen to comprise a hydraulic pump 78 driven by an electrical motor 80 and adapted to draw hydraulic fluid, such as oil, from a sump 82 through a filter 84. The pump 78 discharges into an outlet conduit 86, and the pressure in the conduit 86 is maintained below a predetermined maximum pressure by means of a spring-loaded relief valve 88 that discharges excess fluid pumped back into the sump 82.

A directional control valve 90 is connected to the hydraulic conduit 86 and also to a hydraulic conduit 92. The conduit 92 is located to direct hydraulic fluid back into the sump 82 and has a filter 94 and a spring-loaded check valve 96 in it which are connected in parallel. The valve 90 is also connected to a conduit 98 that in turn is connected to the conduits 58, 60 and 62 and is also connected to a conduit 100 that is connected, indirectly as will be described, with the conduits 64, 66 and 68. The valve 90 comprises a valve piston 102 which in its illustrated position blocks the conduits 98 and 100 with respect to the conduits 86 and 92. The piston 102 has the parallel passages 104 and 106 extending through it on its left end as shown in FIG. 3 and has the crossed passages 108 and 110 in its right end as shown in this figure. An electromagnet having the winding 112 is provided for moving the piston 102 to the right as seen in the figure to align the passages 104 and 106 respectively with the conduits 92 and 86 and is provided with an electromagnet having the winding 114 for pulling the piston 102 in the opposite direction to align the lower ends of the passages 108 and 110 (as the piston 102 is shown in FIG. 3) with the conduits 86 and 92. A suitable return spring (not shown) is provided for yieldably holding the piston 102 in its illustrated neutral position in which it blocks the conduits 92 and 86 with respect to the conduits 98 and 100.

A pilot operated check valve 116 is connected to the conduit 100 and comprises a ball 118 adapted to fit on an upwardly opening seat 120. A branch 98a of the conduit 98 is connected to the seat 120. A ball check valve 122 and a needle control valve 124 are connected in parallel and between the pilot operated check valve 116 and a flow divider 126. The flow divider 126 is also connected with the three conduits 64, 66 and 68.

Figure 5:
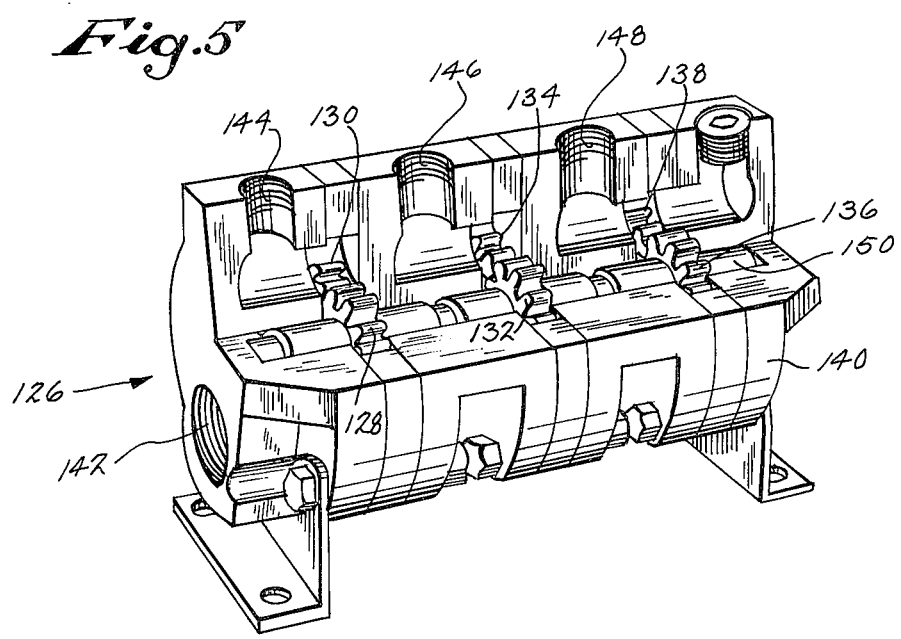
FIG. 5 is a perspective view of a flow divider which is one of the components of the hydraulic system illustrated in FIG. 3.

The flow divider 126 is shown in some detail in FIG. 5 and may be seen to comprise a pair of meshed gears 128 and 130, a pair of meshed gears 132 and 134 and a pair of meshed gears 136 and 138. The gears are disposed in a casing 140 so that the gears 128 and 130 constitute a gear pump or motor of the conventional gear type, and the same is true of the gears 132 and 134 and the gears 136 and 138. The casing 140 has an inlet 142 and has three outlets 144, 146 and 148. The inlet 142 is connected wth the check valve 122 and needle control valve 124; and the outlets 144, 146 and 148 are respectively connected with the conduits 68, 66 and 64. The gears 128, 132 and 136 are fixed on a common shaft 150 so that these gears rotate in unison. The flow divider functions, as will hereafter appear, to provide equal volumes of flow under pressure to the three fluid conduits 64, 66 and 68, with the gear pairs each functioning as a motor and thus being driven by fluid under pressure supplied to the inlet 142 and acting as a fluid pump to discharge through the connected outlet, the outlet 144 for the gears 128 and 130, for example.

Figure 4:
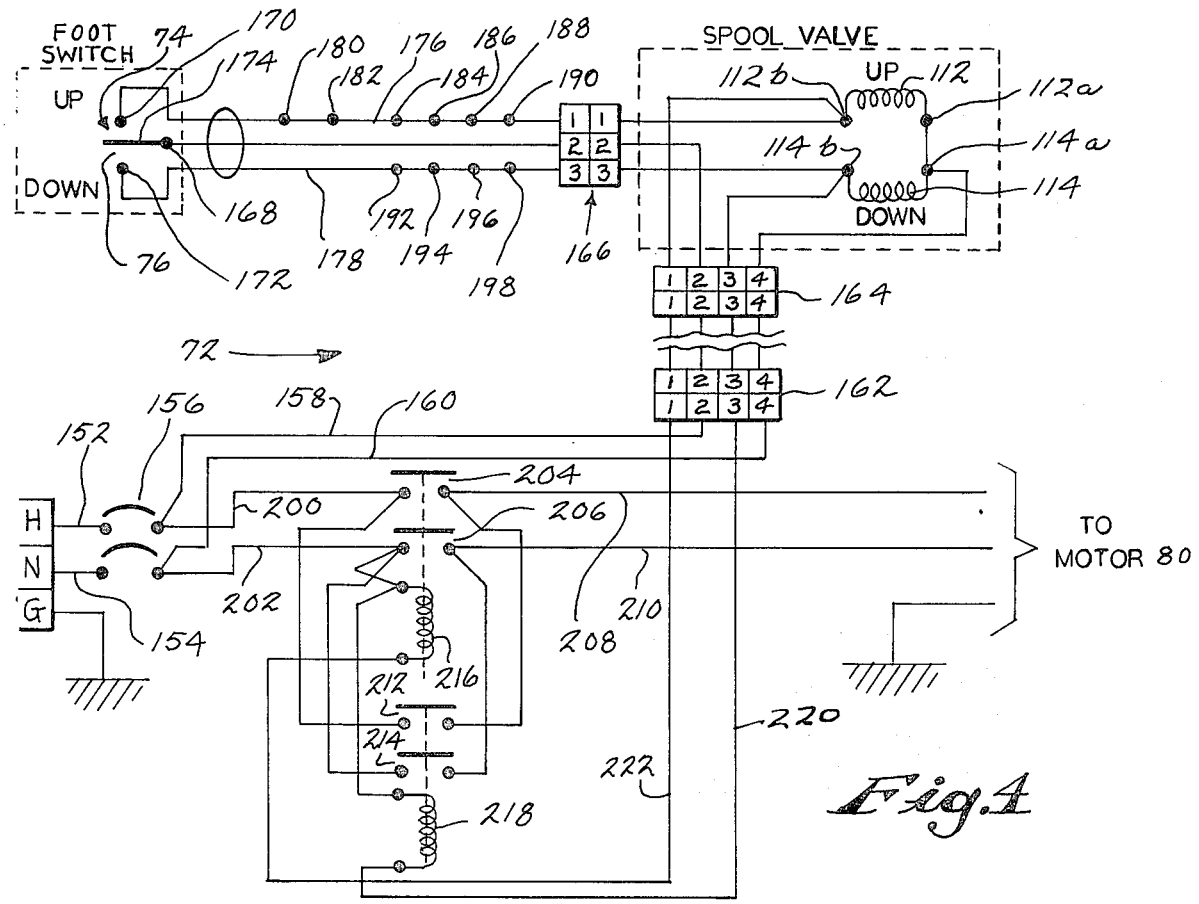
FIG. 4 is a schematic illustration of electrical circuitry used with the hydraulic system shown in FIG. 3.

The electrical circuitry 72 is shown in FIG. 4 and electrically connects the foot operated switches 74 and 76, the windings 112 and 114 for operating the directional control valve 90 and the motor 80 with a voltage source across the leads 152 and 154. A manually operated switch 156 connects the leads 152 and 154 with the leads 158 and 160 when the switch is closed. The lead 160 is connected through connectors 162 and 164 with the terminals 114a and 112a of the windings 112 and 114. The lead 158 is connected through connectors 162, 164 and 166 with the middle terminal 168 of the switches 74 and 76. The switch 74 comprises the contact 170, and the switch 76 comprises the contact 172; and a movable blade 174 in the assembly of the switches 74 and 76 connected with the terminal 168 makes contact with either the contact 170 or the contact 172 depending on whether the switch 74 or the switch 76 is actuated. The contact 170 is connected through a lead 176 and the connector 166 with the terminal 112b of the winding 112, and the contact 172 is connected through a lead 178 and the connector 166 with the terminal 114b of the winding 114. Terminals 180, 182, 184, 186, 188 and 190 are provided in the lead 176; and terminals 192, 194, 196 and 198 are provided in the lead 178 for use with certain modifications of the circuitry to be described hereinafter.

The switch 156 connects the leads 152 and 154 with the leads 200 and 202. Switches 204 and 206 connect the leads 200 and 202 with the leads 208 and 210 which in turn are connected to the motor 80, and a pair of additional switches 212 and 214 are respectively in parallel with the switches 204 and 206 and make the same connections. The switches 204 and 206 are closed due to the action of the same electromagnet 216, and the electromagnet 218 is effective for the same purpose on the switches 212 and 214. One end of the electromagnet 218 is connected to the lead 202, and the other end of the electromagnet 218 is connected by means of a lead 220 and connectors 162 and 164 with the terminal 114b of the winding 114. One end of the electromagnet 216 is connected with the lead 202, and the other end of the electromagnet 216 is connected by means of a lead 222 and connectors 162 and 164 with the terminal 112b of the winding 112.

In operation, the piano 12 is put into position supported by the dolly 10 with the piano legs 14, 16, and 18 being positioned in the cups 28, 30, and 32. The piano 12 at this time is in the usual playing height; and the lower ends of the piano legs 14, 16, and 18 are very nearly at the same height as the platform or floor. When the piano player wishes to elevate the piano so that he may stand up and play it, as when singing, he depresses the UP switch 74 using his foot and holds it depressed. It is assumed that the switches 74 and 76 have spring means incorporated in them so that, when either of the switches is released, the switch will automatically open. Closure of the switch 74 completes an electrical circuit through the UP winding 112 of the directional control valve 90, this circuit being through the leads 152 and 158, the connectors 162 and 164, the terminal 168, the switch blade 174, the contact 170, the lead 176, the connector 166, the winding 112, the terminals 112a and 114a, the connectors 164 and 162 and the lead 160 to the lead 154. It is assumed that the manual switch 156 is closed so that the leads 158 and 160 are respectively connected with the leads 152 and 154. The winding 112 is thus energized and the valve piston 102 is drawn to the right as seen in FIG. 3 so as to connect the conduits 86 and 100 and the conduits 92 and 98 by means of the passages 104 and 106. An electrical circuit is also completed by the switch 74 from the terminal 112b through the lead 222 and the electromagnet 216 to the leads 202 and 154. The electromagnet 216 is thus energized and the switches 204 and 206 are closed. Voltage is thus applied to the leads 208 and 210 to start the motor 80 in operation.

The motor 80 drives the pump 78 which draws hydraulic fluid from the sump 82 and discharges it into the conduit 86. The fluid pressure in the conduit 86 is maintained at a predetermined maximum by the spring loaded relief valve 88. The fluid under pressure passes through the conduit 100 and opens the check valves 116 and 122 so that the fluid under pressure is applied to the port 142 of the flow divider 126. The fluid under pressure is thus applied to the pairs of gears 128 and 130, 132 and 134 and 136 and 138 so that these pairs of gears each functions as a motor, rotating the gears with respect to each other. These pairs of gears also function as fluid pumps so that fluid is in effect transmitted under pressure from the inlet 142 to the outlets 144, 146 and 148 of the flow divider 126. Since the gears 128, 132, and 136 are fixed on the same shaft 150, the pumping action of the pairs of gears is the same; and equal volumes of fluid under pressure are supplied to the outlet ports 144, 146, and 148. These equal volumes of fluid under pressure are supplied through the conduits 64, 66, and 68 to the upper ends of the cylinders 34, 36, and 38 exerting an upward force on the upper ends of each of the cylinders 34, 36, and 38. The pedestals 52, 54 and 56 in which the piston rods 46, 48, and 50 are fixed are disposed on the floor or platform; and this fluid pressure applied in the upper ends of the cylinders 34, 36 and 38 exerts an upward force on the dolly legs 20, 22 and 24 and thus on the lower ends of the piano legs 14, 16, and 18 so that the dolly 10 and the piano 12 are elevated. This elevation continues until the player releases the UP switch 74, and the winding 112 and the electromagnet 216 are thus deenergized at this time. The valve piston 102 then returns to its neutral position in which it is shown in FIG. 3 by the spring means associated with the piston 102 so as to block the conduits 86 and 92 with respect to the conduits 100 and 98. Each of the electromagnets 216 and 218 has spring means associated with it so that the switches 204 and 206 are opened at this time; and the motor 80 and pump 78 also cease operation. The check valve 116 closes at this time so that the fluid under pressure within the upper ends of the cylinders 34, 36, and 38 remains and holds the dolly 10 and piano 12 in elevated position. The piano player then has the keyboard at the proper height so that he may easily play the piano while standing and while singing.

When the piano player wishes to return the piano to its original lowered position or to simply lower the piano a predetermined distance short of that, he depresses the DOWN switch 76 and keeps the switch 76 depressed until the piano reaches the desired lower position. The closure of the switch 76 completes an electrical circuit from the lead 158 through the connectors 162, 164, and 166, the terminal 168, the switch blade 174, the contact 172, and the lead 178 to the winding 114 of the directional control valve 90. The winding 114 is thus energized, since its terminal 114a is connected through the connectors 164 and 162 to the lead 160, and the valve piston 102 is moved to the left as seen in FIG. 3. The terminal 114b of the winding 114 is connected through the connectors 164 and 162 and lead 220 to the electromagnet 218, and the electromagnet 218 is thus effective at this time to close the switches 212 and 214. The switches 212 and 214 are in parallel with the switches 204 and 206 and have the same effect in supplying voltage to the motor 80 so that the motor 80 is effective to drive the pump 78.

The pump 78 is effective as before to provide fluid under pressure to the conduit 86, and the passage 110 is effective for supplying fluid pressure from the conduit 86 to the conduit 98. The conduit 98 is connected with the conduits 58, 60, and 62; and fluid under pressure is thus supplied to the lower ends of the cylinders 34, 36, and 38. The fluid under pressure effective on the lower ends of the cylinders 34, 36 and 38 has the effect of moving these cylinders downwardly with respect to the pistons 40, 42 and 44; and this movement is also due to the weight of the piano 12 and dolly 10 which exert a constant force downwardly due to gravity. Thus, the dolly 10 and piano 12 descend as long as the switch 76 is kept closed. The fluid present in the upper ends of the cylinders 34, 36, and 38 flows back through the flow divider 126; and the gears 128, 130, 132, 134, 136 and 138 rotate in the opposite directions from their rotations when the dolly and the piano are being elevated. The fluid flows back through the inlet 142 of the flow divider 126 and through the needle control valve 124 which is adjusted manually to provide just the desired speed of downward movement of the dolly 10 and piano 12. The fluid pressure in the conduit 98 supplied from the valve 90 is also supplied through the branch conduit 98a to the pilot operated check valve 116; and the fluid pressure is applied particularly through the upwardly opening seat 120 of the valve 116 so as to raise the ball 118 from the seat 120 and allow the fluid flowing through the needle control valve 124 to flow to the sump 82 through the passage 108, the conduit 92 and the check valve 96.

It should be noted that the check valve 116 provides a fail safe operation in that the check valve 116 is closed whenever the dolly 10 and piano 12 are in elevated position with the switches 74 and 76 being open. The fluid under pressure in the upper ends of the cylinders 34, 36 and 38 tends of course to flow backwardly through the conduits 64, 66 and 68, the flow divider 126 and the needle control valve 124; but, since the ball 118 of the valve 116 seats firmly at this time on its seat 120, there can be no such reverse flow and the dolly 10 and piano 12 remain in their elevated positions.

Figure 8:
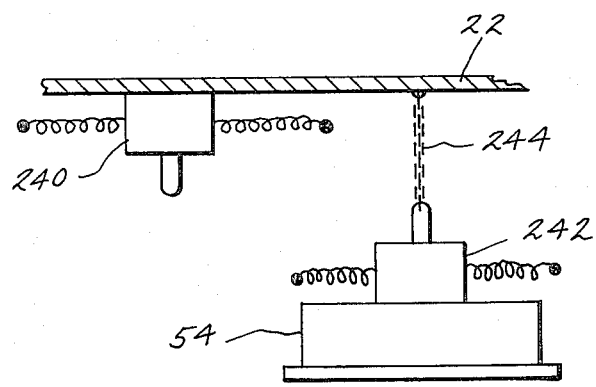
FIG. 8 shows schematically other circuitry that may be used to modify the FIG. 3 circuitry.

In the electrical circuit modification shown in FIG. 8, a pair of switches 240 and 242 are respectively mounted on one of the legs of the dolly 10 and the associated pedestal, the dolly leg 22 and the pedestal 54 for example. The leads 176 and 178 are broken between the terminals 188 and 190 and the terminals 196 and 198; and the switch 240 is connected between the terminals 196 and 198, and the switch 242 is connected between the terminals 188 and 190. A flexible chain 244 is connected between the dolly leg 22 and the actuator of the switch 242 so that when the dolly 10 reaches a predetermined height off of the platform or floor, the chain 244 is effective to open the switch 242. The switch 240 is adapted to be actuated by hitting the piano supporting floor or the upper surface of the pedestal 54, and this switch is opened at this time. Thus, when the dolly 10 and piano 12 reach a predetermined height on elevation of them, the switch 242 will be opened and in effect break the electrical connection to the UP switch 74 thus causing the valve 90 to return to its original condition and deenergizing the motor 80 and pump 78. Similarly, on a lowering of the dolly 10 and piano 12, the switch 240 will be opened thus in effect breaking an electrical connection in series with the DOWN switch 76 so that under these conditions the valve 90 is returned to its original condition and the motor 80 and pump 78 are stopped. With this modification, both of the switches 74 and 76 may be of the maintained closed type in which, once the switch is closed, it remains closed even though the foot is taken off of the switch.

Figure 7:
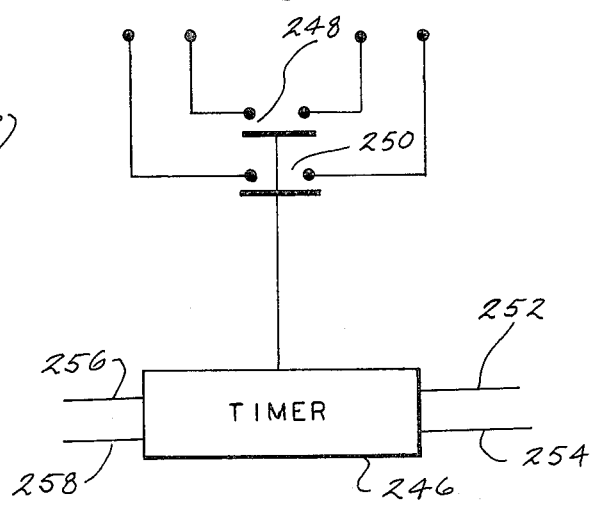
Fig. 7 is a schematic illustration of other modifying circuitry for the FIG. 4 circuitry.

The circuit modification shown in FIG. 7 includes a timer 246 actuating a pair of switches 248 and 250. The leads 176 and 178 are broken between the terminals 184 and 186 and between the terminals 192 and 194, and the switch 248 is then connected between terminals 184 and 186, and the switch 250 is connected between the terminals 192 and 194. The timer has a pair of control leads 252 and 254 that are respectively connected to the terminals 114a and 114b and a pair of control leads 256 and 258 that are respectively connected to the terminals 112a and 112b. The timer 246 is operative to open the switches 248 and 250 and thus in effect break the leads 176 and 178 after a predetermined time has expired after either the switch 74 or 76 is closed. Thus, either the raising or lowering movement of the dolly 10 and piano 12 ceases on a predetermined time after beginning. Preferably, the switches 74 and 76 in this case are also, as with the FIG. 8 option, of the maintained contact switch variety in which the switches 74 and 76 remain closed once they have been initially closed, instead of the momentary contact type previously described in connection with the first described embodiment.

Figure 6:
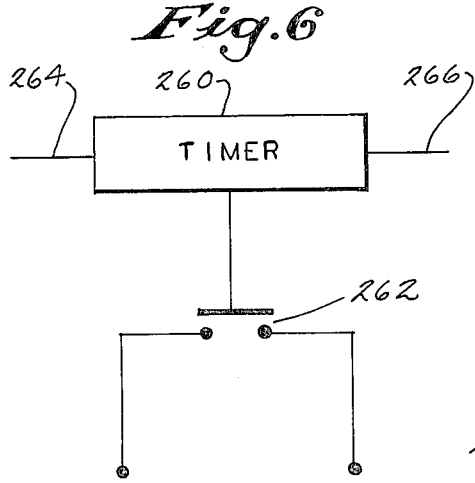
FIG. 6 is a schematic illustration of electrical circuit that may be used in connection with the FIG. 4 circuitry as a modification thereof.

The FIG. 6 circuit modification includes the timer 260 for opening a switch 262. The lead 176 of FIG. 4 is broken between the terminals 180 and 182, and the switch 262 is connected between these two terminals. The timer 260 has a pair of control leads 264 and 266, and these leads are connected respectively between the terminals 112a and 112b. The timer 260 operates to open the switch 262 a predetermined time after the UP switch 74 has been closed to elevate the piano so that this elevating movement ceases. In connection with this circuit modification, preferably the UP switch 74 is of the maintained contact type, remaining closed once it has been initially closed, while the DOWN switch 76 is of the momentary contact type described in connection with the first embodiment of the invention so that the switch 76 must be maintained depressed and closed in order to cause the piano 12 to move all the way down to its lowermost position.

The piano 12 may be easily moved from one location on the supporting floor to another by placing a small roller supported platform directly under the lower ends of each of the piano legs 14, 16 and 18 while the dolly 10 and piano 12 are in raised positions and then lowering the dolly 10 and piano 12 so that the portions of the dolly on which the cups 28, 30 and 32 are placed rest on the small platforms. The pedestals 52, 54 and 56 at this time are off the floor, and the dolly and piano may then be shoved to a new position manually.

It may be notd that the piano 12 when in its lowermost position with the pistons 40, 42 and 44 being retracted fully into their respective cylinders is very nearly at the same low level as in the case in which the piano 12 rests directly on a floor or platform. This is due to the fact that the very end portions of the legs 20, 22 and 24 on which the cups 28, 30 and 32 rest are at lower levels than the remainders of the legs 20, 22 and 24, so that the bottoms of the recesses in the cups 28, 30 and 32 are very nearly at the same low level as the bottoms of the pedestals 52 in contact with the floor or platform.

Although the piston-cylinder arrangements (such as the piston 40 in the cylinder 34) have been shown as being of the simple type, these arrangements may be of the cushioned type which are available commercially. Cylinder cushions may be of various types. One type usable with the present invention is illustrated and described in the article "Designing Cylinder Cushions On A Desktop Computer" starting on page 87 of the magazine "Machine Design" of May 20, 1982, and comprises a tapered spear carried by the piston in a cylinder and moving with the piston through a restricted inside diameter damping ring carried by the cylinder for slowing the relative movement of the piston and cylinder due to the restricted fluid flow between the spear and damping ring.

Advantageously, the piano lift is of an adjustable type and has practical as well as special effect uses. The piano player simply steps on the UP switch to activate the lift causing the piano 12 to rise to a desired comfortable height. This enables the player to stand while playing and singing. A player can sing with much greater ease and comfort if he is standing, and the piano lift of the invention allows a performer to simultaneously stand up and comfortably play the piano. The lift of the invention also serves as adjustable height mechanism while a player is seated to allow players of all heights to be more comfortable. The lift also can serve as a crowd pleaser for gaining audience attention and excitement during a performance, fulfilling the special effect feature.

The dolly 10 is of a readily available and conventional type which has been modified with the cylinders 34, 36, and 38 fixed with respect to the dolly legs 20, 22, and 24 in place of floor rollers supplied originally with the dolly. The retrofitted three hydraulic cylinders 34, 36, and 38 push downwardly on the floor through the associated piston rods and pedestals causing the piano lifting action as described. The cylinders 34, 36, and 38 rise evenly due to the action of the three-way flow divider 126; therefore the piano remains horizontal throughout its vertical motion.

The piano lift of the invention has quiet operation and is effectively under the control of the piano player. The piano lift is portable and has a fail-safe operation due particularly to the ball check valve 116. The piano lift does not damage or physically modify the piano in any way and is extremely simple to set up and operate. The descend rate is adjustable using the needle control valve 124, and the lift is stable at all heights and does not provide an abrupt motion at any time. An actual embodiment of the piano lift was effective to lift a grand piano from zero to twelve inches, and the lift had a safety factor of two to three times in its ability to lift. The rate of piano lift was greater than or equal to one inch per second.

We claim:

1. Mechanism for supporting and raising a grand piano having three vertical spaced supporting legs two of which are at the front of the piano and the third of which is at the rear end of the piano and including a dolly having three spaced recesses that receive the lower ends of the three legs of the piano so that the dolly may support the piano, a vertically disposed hydraulic cylinder fixed with respect to said dolly and extending upwardly from the level of said recesses and located adjacent to each of said recesses and being disposed in the triangle formed by said recesses, each of said cylinders having a piston movably disposed therein and carrying a piston rod adapted to move downwardly out of the cylinder with corresponding movement of the piston in the cylinder, a pedestal portion on the end of each of said rods and adapted to rest on the supporting floor for the dolly and piano, a source of fluid pressure, and valve means for connecting said fluid pressure source with upper ends of said cylinders so as to tend to move the pistons downwardly in the cylinders and thus move the dolly and piano upwardly while being supported by said pedestal portions.

2. Mechanism for supporting and raising a grand piano as set forth in claim 1, said dolly having three horizontal legs extending generally radially from an approximate center and fixed with respect to each other at said center and having said recesses at their ends and said cylinders being fixed respectively with respect to said legs.

3. Mechanism for supporting and raising a grand piano as set forth in claim 2, said dolly legs being flat except for a portion on the end of each dolly leg containing the said recess in the leg which is bent to be at a lower level than the remainder of the dolly leg so that the bottom of the recess is nearly at the same low level as the bottom of the said pedestal portion of the piston rod of the cylinder carried by this leg.

4. Mechanism for supporting and raising a grand piano as set forth in claim 2 and including flow divider means effectively between said fluid source and said cylinders for causing substantially the same volumes of fluid to flow to the cylinders as fluid is being applied to the cylinders for raising the dolly and piano.

5. Mechanism for supporting and raising a grand piano as set forth in claim 4 and including electrical circuit means for controlling said valve means and an UP pedally operated switch controlling said electrical circuit means so that said dolly and piano may be raised by actuating said pedally operated switch.

6. Mechanism for supporting and raising a grand piano as set forth in claim 5, said electrical circuit means and said source of fluid pressure and said valve means being mounted on said horizontal legs substantially at said approximate center.

7. Mechanism for supporting and raising a grand piano as set forth in claim 5 and including also a DOWN pedally operated switch controlling said electrical circuit means so that said dolly and piano may be lowered by actuating said DOWN switch after the dolly and piano have been initially raised.

* * * * *